Figure 1:
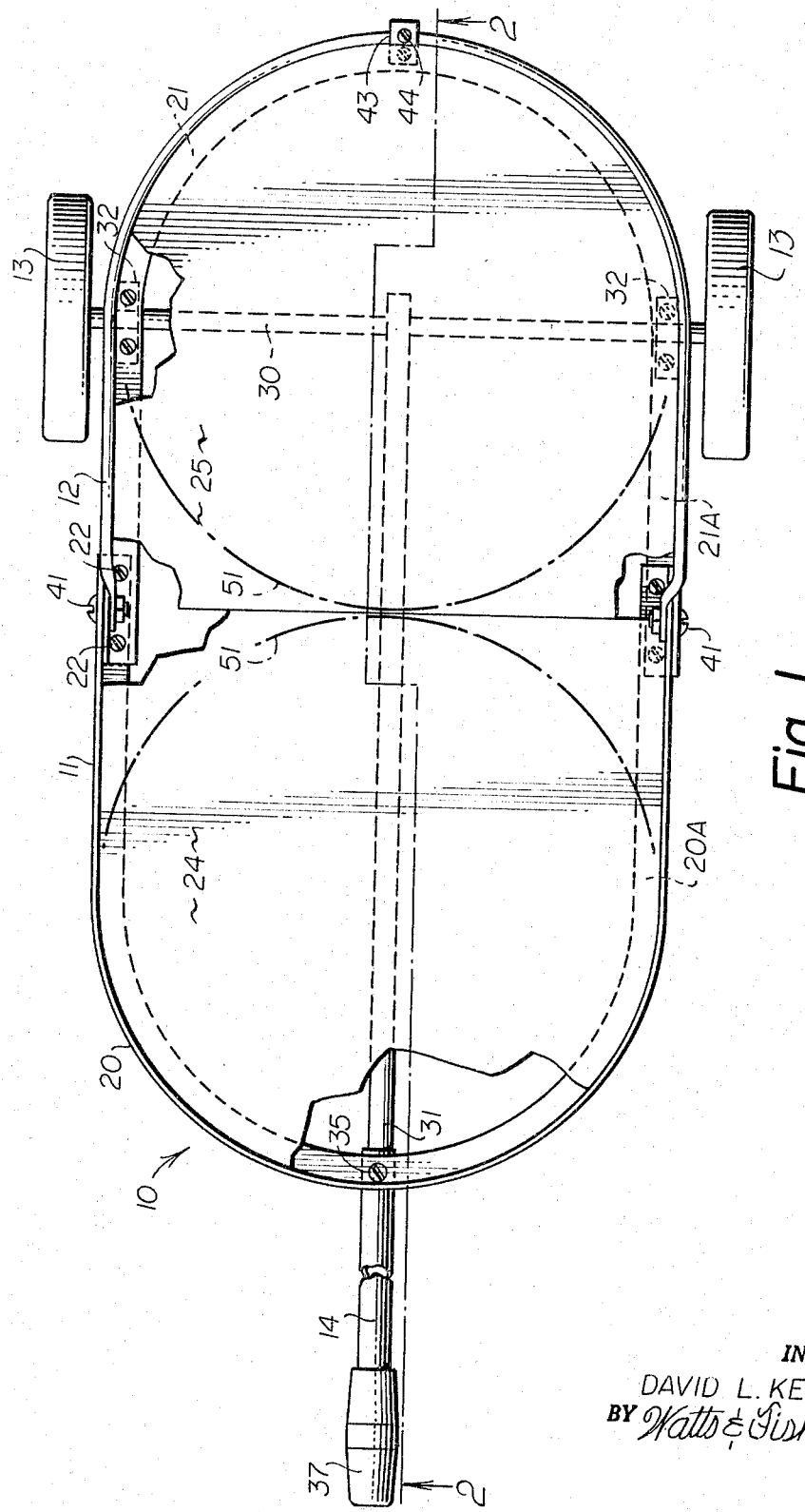

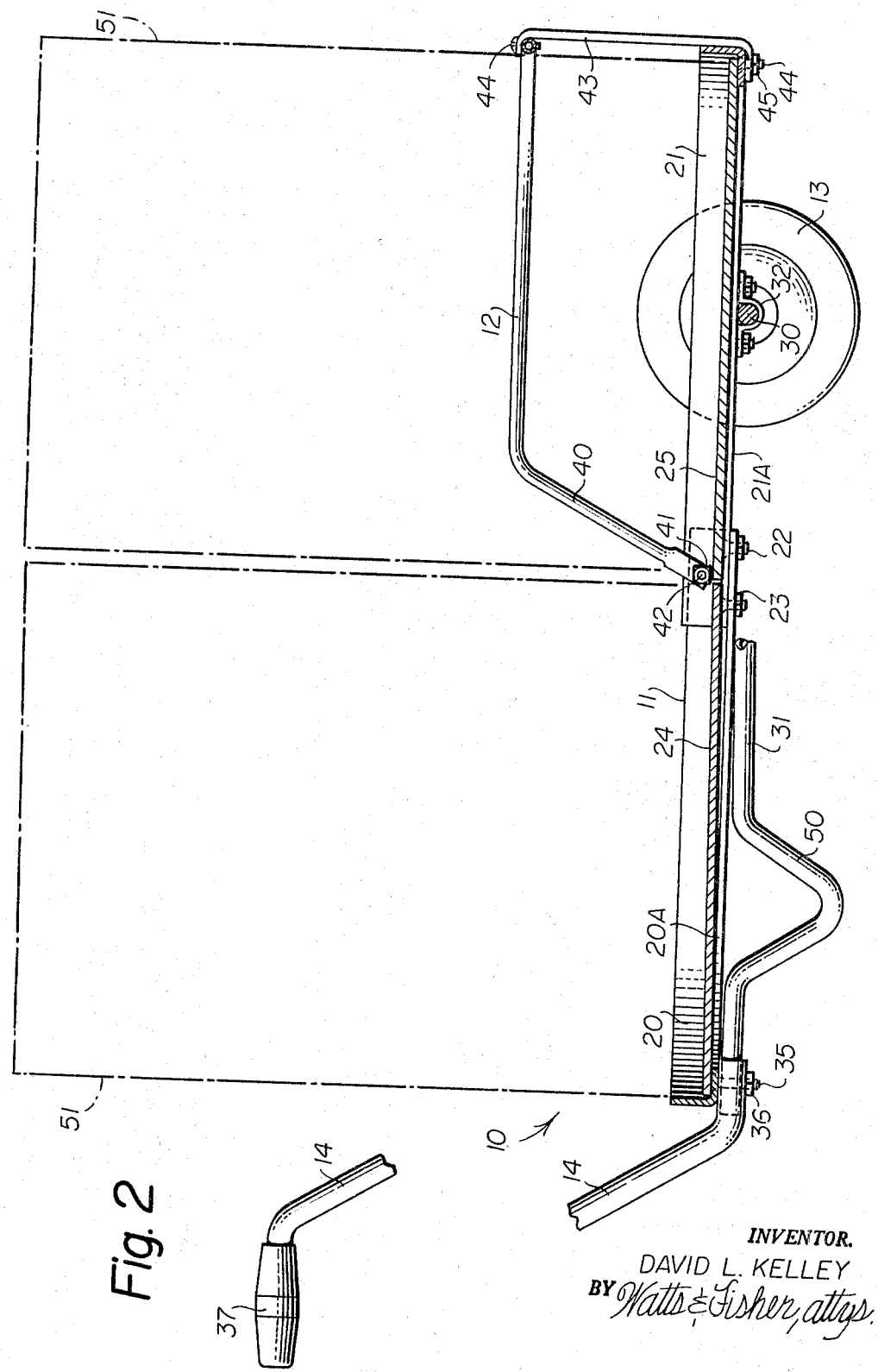

United States Patent Office 3,325,182
Patented June 13, 1967

3,325,182
UTILITY CART
David L. Kelley, Novelty, Ohio, assignor to Du-Fold, Inc.
Filed Dec. 10, 1965, Ser. No. 512,928
6 Claims. (Cl. 280—47.19)

This invention relates generally to utility carts, and more specifically to a wheel-supported, hand-propelled cart which is of general utility in household use.

In recent years a variety of utility cart constructions have been devised for home use, particularly for handling trash cans and garbage cans. Many of these prior constructions have been characterized by a tubular frame structure including a bottom section on which the cans are supported and a top section composed of frame members that extend around the sides and ends of the cart to embrace the upper ends of the cans. One disadvantage of this prior construction is that it is necessary to lift the loaded and often heavy trash cans over the top frame members in order to place the cans on the cart. Similarly, when removing the cans from the cart, it has been necessary to lift the cans vertically a distance substantially equal to their height. Another disadvantage of many of the conventional constructions is that they are specially designed to handle trash cans and have limited utility in transporting other objects.

Many of the conventional utility carts have also been characterized by a unitary construction which is costly to manufacture and expensive to ship. Other carts which can be broken down for shipment are relatively complex and a considerable amount of time and effort are required to assemble them for use.

The present invention provides a new, easy-to-use utility cart which is constructed in a novel manner such that the cart can be used for a wide variety of purposes. The new cart is especially useful for transporting trash cans and the like and is constructed so that the cans can be placed on and removed from the cart without the physical effort required when using conventional constructions. The cart of this invention can be used with equal facility in yard work, such as for moving trees or shrubs, as well as for transporting many other heavy and unwieldy objects.

The new cart is further characterized by the simplicity of its construction which permits it to be broken down into components that can be shipped inexpensively and easily assembled for subsequent use. In the preferred embodiment, the cart comprises a knock-down frame formed by two substantially identical sub-assemblies. The frame sub-assemblies together with the other component parts of the cart can be packaged in a compact manner which minimizes shipping costs. At the same time, the frame sub-assemblies and other component parts can be quickly connected together with a relatively few bolts or other fastening elements to provide a strong and rigid construction capable of sustaining heavy weights.

In its assembled form, the new cart has a three-point contact with the ground which provides solid footing on irregular terrain and prevents the cart from being inadvertently overturned. The three-point footing of the cart also permits its forward end to be tipped toward either side so that heavy objects can be rolled onto or off the cart. When used in this way, the cart eliminates the necessity of lifting the objects as has been necessary with many conventional constructions.

The cart is also specially constructed so that it can be easily pulled and manipulated. The structure is such that the wheels resist the tendency to sink into soft ground because of heavy loads on the cart. The handle which is provided at the forward end of the cart cooperates with the rest of the structure to afford leverage for lifting the cart and its load and to facilitate pulling the cart over any obstacles.

Other features and a full understanding of the invention will be had by reference to the following detailed description and the accompanying drawings.

In the drawings:

FIGURE 1 is a top plan view of a preferred cart construction of this invention; and FIGURE 2 is a vertical cross-sectional view taken on the line 2—2 of FIG. 1.

Referring now to the drawings, the preferred embodiment of the invention is generally designated by reference numeral 10. The cart 10 includes a supporting base 11, a side rail 12 around the rear section of the base 11, wheels 13 and a tubular handle 14.

The base 11 is formed by two substantially identical frame sections which permit the cart 10 to be broken down into components that can be inexpensively shipped and later assembled in a facile manner to form a strong, light-weight structure. The two frame sections of the base 11 include a pair of opposed, U-shaped frame members 20, 21. The frame members 20, 21 are L-shaped in cross-section and the ends of the two members are overlapped at the sides of the cart in order to provide a rigid, endless frame when connected together. As shown, the overlapped ends are fastened together by two bolts 22 which extend through the horizontal flanges 20A, 21A of the members 20, 21 respectively, and by cooperating nuts 23. The two frame sections also include a pair of identical bottom panels or trays 24, 25 which define a floor section for the cart. The panels 24, 25 are respectively supported by the frame members 20, 21 and are preferably riveted or otherwise secured to the horizontal flanges 20A, 21A. These panels or trays 24, 25 may be formed of wood, metal or other suitable material.

The panels or trays 24, 25 are further supported on their undersides by an axle 30 which rotatably carries the wheels 13 and by a tube 31 which projects longitudinally of the cart 10. The axle 30 extends transversely of the rear frame section 21 and is connected to the lower surface of the flange 21A by straps 32. In the preferred construction, the axle 30 is positioned approximately midway between the transverse centerline of the cart and its rear end so that the axle is centered below the panel 25 to afford good balance to the cart. The tube 31 bridges the adjacent edges of the two panels 24, 25 and extends below the panel 24 from the front end of the cart to the axle 30. In the illustrated construction, the axle 30 passes through a hole formed in the rear free end of the tube 31.

The handle 14 forms a continuation of the tube 31 and extends forwardly and upwardly from the front end of the cart 10. As is most clearly shown in FIG. 2, the handle 14 and the tube 31 are preferably separate members having their mating ends telescoped together and connected to the underside of the frame section 20 by a single bolt 35 and a cooperating nut 36. The upper free end of the handle 14 may be provided with a handle grip 37. The handle is inclined and is of such a length as to permit the cart to be pulled behind the user without bumping his heels. The length of the handle 14 also affords good leverage for lifting the cart and its load and permits the cart to be easily pulled over any obstacles.

The cans or other objects carried on the cart 10 are stabilized and prevented from sliding from the rear section of the base by the rail 12 when the cart is moved. In the illustrated construction, the rail 12 is a single, U-shaped tubular member which is spaced above the frame section 21 and is formed with downwardly bent terminal end portions 40. Each of the end portions 40 is attached to the overlapped ends of the frame sections 20, 21 by a bolt 41 and a nut 42. The bolts 41 and nuts 42 also cooperate to complete the rigid connection between the overlapped ends of the frame sections 20, 21. A brace 43 is secured at the rear of the cart between the bight of the U-shaped rail 12 and the vertical flange of the frame section 21 by bolts 44 and nuts 45.

As generally described above, one feature of the new construction resides in the three-point contact which the cart has with the ground. This three-point support is afforded by the two wheels 13 on the rear section of the cart and by a foot 50 below the front section of the cart. The foot 50 may be formed by a downward bend in the tube 31. The foot 50 is on the longitudinal centerline of the cart 10 and, in order to afford proper balance to the cart and to prevent it from tipping forward when a can or other object is placed on the panel 24, is preferably located near the forward end of the cart. The three-point support formed by the wheels 13 and the foot 50 affords a solid footing to the cart on irregular terrain, thus making the cart ideally suited for yard use. In addition, the construction is such that cans or other objects can be placed on or removed from the cart with a minimum amount of physical effort.

In the drawings, two refuse cans 51 are shown by broken lines on the cart 10. When constructed in the preferred manner, the forward section of the cart can be tipped to either side about the foot 50 simply by pressing down on the front side of the frame section 20. This permits each of the cans 51 to be rolled onto the cart without lifting the can. Similarly, when unloading the cart, the forward end can be tipped to either side to permit the can 51 to be rolled onto the ground. The same advantages in unloading and loading the cart are obtained when using it to transport balled trees and shrubs and other heavy objects.

It will be apparent from the foregoing description that the cart 10 can be broken down into relatively small components for economical shipment. When disassembled, the two frame sections including the members 20, 21 and the attached panels 23, 24 can be nested together. The disconnected handle 41 and the tube 31, the wheels 14, the axle 30 and the rail 12 can be placed on the nested frame sections to form a compact package. At the same time, the components of the cart 10 can be quickly and easily assembled. This is accomplished simply by securing together the ends of the frame members 20, 21, attaching the rail 12 to the frame sections by the two bolts 41 and the brace 43, securing the handle 14 and the tube 31 together and to the frame sections by the bolt 35, and then mounting the wheel and axle assembly 14, 31.

The completed assembly is light in weight and yet forms a strong construction which is capable of supporting heavy objects and of being conveniently moved. The ends of the frame sections 20, 21 which are overlapped at the sides of the cart contribute to the rigidity of the base section 11. Further, as noted above, the axle 30 and the tube 31 which lie adjacent to the plane of the horizontal frame flanges 20A, 21A add to the support of each of the panels 24, 25. The wheels 13 which are preferably rectangular in transverse cross-section, the length and inclination of the handle 14, and the rounded front section defined by the U-shaped frame member 20 all cooperate to provide a cart which can be easily and conveniently pulled behind the user on soft and uneven ground.

Many variations and modifications of the invention will be apparent to those skilled in the art in the light of the foregoing detailed disclosure. Therefore, it is to be understood that, within the scope of the appended claims, the invention can be practiced otherwise than as specifically shown and described.

What is claimed is:
1. A utility cart comprising:
  (a) a substantially flat, planar base having first and second end portions;
  (b) said base including:
    (i) a continuous peripheral frame,
    (ii) at last one panel supported on said frame to define a floor for said cart;
  (c) an axle traversing said first base portion below said floor;
  (d) wheels connected to said axle near the sides of said base;
  (e) a ground support foot connected to said cart and positioned below said second base portion;
  (f) said foot being spaced from said axle and disposed on the longitudinal centerline of said base so that said cart can be tipped to either side about said foot;
  (g) side rail structure connected to said base;
  (h) said side rail structure extending around at least part of said first base portion above said floor and terminating short of the end of said cart opposite to said first base portion;
  (i) a handle connected to said cart and extending upwardly from said second base portion.

2. A utility cart as claimed in claim 1 wherein said handle is a rigid member which projects upwardly from the underside of said base and lies in a plane containing the longitudinal centerline of said base.

3. A utility cart in claim 1 including a support element disposed below said base and extending along the longitudinal centerline thereof, said support element having one end connected to said axle, and said handle forming a continuation of the opposite end of said support element.

4. A utility cart as claimed in claim 1 wherein said frame comprises a pair of U-shaped members having their ends overlapped and connected together at the sides of said cart; and wherein a separate panel is supported by each of said frame members to define said floor.

5. A utility cart as claimed in claim 4 wherein said foot comprises part of a support element, said support element extending below said floor from said handle to said axle and bridging the adjacent edges of said panels; and wherein said axle and support element are positioned to provide support to the underside of said panels.

6. A utility cart comprising in combination:
  (a) a base,
  (b) said base including:
    (i) a pair of U-shaped members,
    (ii) releasable fastening means securing the ends of said members together to form a continuous, peripheral frame,
    (iii) said members having inwardly extending horizontal portions, and
    (iv) removable panel means supported on said horizontal portions to define a floor,
  (c) wheels connected to said cart near the sides of said base,
  (d) said wheels being located between one end of said cart and the transverse centerline thereof,
  (e) a first support element extending between said wheels across the underside of said panel means, (f) a second support element below said panel means extending from said first support element along the longitudinal centerline of said base, (g) said second support element having a portion which defines a ground-engageable foot, (h) said foot being located between the transverse centerline of said base and the end of said cart opposite said one end, (i) a handle member connected to said second support element, (j) said handle projecting upwardly from the end of said cart opposite said one end and lying in a plane containing the longitudinal centerline of said base, and (k) a side rail extending around said one end of said cart, (l) said rail having an intermediate portion spaced above said frame and end portions connected to said frame by said releasable fastening means.

References Cited

UNITED STATES PATENTS

| | | | |
|---|---|---|---|
| 288,019 | 11/1883 | Cockburn | 280—47.33 |
| 2,028,023 | 1/1936 | Smith | 280—47.27 |
| 2,171,068 | 8/1939 | Masters | 280—47.18 |
| 2,526,295 | 10/1950 | Stoltzfus | 280—47.23 |

FOREIGN PATENTS

| | | |
|---|---|---|
| 300,776 | 11/1928 | Great Britain. |
| 644,108 | 10/1950 | Great Britain. |

BENJAMIN HERSH, *Primary Examiner.*

J. A. PEKAR, *Assistant Examiner.*